US 9,898,366 B2

(12) United States Patent
Krishnamurthy et al.

(10) Patent No.: US 9,898,366 B2
(45) Date of Patent: *Feb. 20, 2018

(54) ENERGY CONSCIOUS MOBILE DEVICE REDUNDANCY AND RECOVERY

(71) Applicant: International Business Machines Corporation, Armonk, NY (US)

(72) Inventors: Rajaram B. Krishnamurthy, Wappingers Falls, NY (US); Daniel A. Rogers, San Leandro, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/824,622

(22) Filed: Aug. 12, 2015

(65) Prior Publication Data

US 2016/0179623 A1    Jun. 23, 2016

Related U.S. Application Data

(63) Continuation of application No. 14/573,648, filed on Dec. 17, 2014.

(51) Int. Cl.
G06F 11/00 (2006.01)
G06F 11/14 (2006.01)
H04W 4/22 (2009.01)

(52) U.S. Cl.
CPC .......... G06F 11/142 (2013.01); H04W 4/22 (2013.01); *G06F 2201/85* (2013.01); *G06F 2201/86* (2013.01)

(58) Field of Classification Search
CPC ............. G06F 11/142; G06F 11/1402; G06F 11/1415; G06F 2201/85; G06F 2201/86;
(Continued)

(56) References Cited

U.S. PATENT DOCUMENTS 6,101,421 A * 8/2000 Goedken ............... G05B 9/02
                                                    700/79
6,453,266 B1 * 9/2002 Chainer ................ G06F 1/1613
                                                    340/506
(Continued)

OTHER PUBLICATIONS

O. Mokryn, D. Karmi, A. Elkayam and T. Teller, "Help Me: Opportunistic smart rescue application and system," Ad Hoc Networking Workshop (Med-Hoc-Net), 2012 The 11th Annual Mediterranean, Ayia Napa, 2012, pp. 98-105.*

(Continued)

*Primary Examiner* — Bryce Bonzo
*Assistant Examiner* — Anthony J Amoroso
(74) *Attorney, Agent, or Firm* — Maeve Carpenter; Alexander G. Jochym

(57) ABSTRACT

A tool for redundancy and recovery for a mobile device. The tool probes for one or more available resources on the mobile device, wherein probing for the one or more available resources includes gathering diagnostic information related to the one or more available resources. The tool determines a device functionality for the mobile device, wherein the device functionality is an energy conscious recovery plan including one or more features available on the mobile device. The tool scavenges for at least one resource to support the device functionality for the mobile device. The tool restores the device functionality for the mobile device, wherein restoring the device functionality includes utilizing the at least one resource and one or more energy conscious techniques.

7 Claims, 3 Drawing Sheets

(58) Field of Classification Search
CPC ... G06F 2216/05; H04W 4/22; H04W 76/007; H04W 4/02; H04W 4/021; H04W 4/025; H04W 12/06; H04W 12/08
See application file for complete search history.

(56) References Cited

U.S. PATENT DOCUMENTS

| | | | |
|---|---|---|---|
| 7,861,242 | B2 | 12/2010 | Rygaard |
| 7,865,710 | B2 | 1/2011 | Thomas et al. |
| 7,941,810 | B2 * | 5/2011 | Khanna ................ G06F 11/004 717/168 |
| 8,238,309 | B1 | 8/2012 | Breau |
| 8,350,694 | B1 | 1/2013 | Trundle et al. |
| 2009/0276623 | A1 | 11/2009 | Jevans et al. |
| 2010/0210240 | A1 | 8/2010 | Mahaffey et al. |
| 2010/0229220 | A1 | 9/2010 | Tsai |
| 2012/0100824 | A1 | 4/2012 | Michael |
| 2013/0010959 | A1 | 1/2013 | Shih |
| 2013/0055016 | A1 | 2/2013 | Charles et al. |
| 2013/0311836 | A1 * | 11/2013 | Hurst ................ G06F 11/0742 714/48 |
| 2015/0089287 | A1 * | 3/2015 | Jayakumar ................ G06F 1/30 714/23 |

OTHER PUBLICATIONS

Tanenbaum, Andrew S. "1.4 Hardware, Software, and Multilevel Machines." In Structured Computer Organization, pp. 11-13. 3rd ed. Prentice-Hall, 1990.*
J. A. Paradiso and T. Starner, "Energy scavenging for mobile and wireless electronics," in IEEE Pervasive Computing, vol. 4, No. 1, pp. 18-27, Jan.-Mar. 2005.*
O. Mokryn, D. Karmi, A. Elkayam and T. Teller, "Help Me: Opportunistic smart rescue application and system," Ad Hoc Networking Workshop (Med-Hoc-Net), 2012 The 11th Annual Mediterranean, Ayia Napa, 2012, pp. 98-105.*
Mokryn et al., "Help Me: Opportunistic Smart Rescue Application and System", School of Computer Science, Tel Aviv Yaffo College, Israel, 2012 The 11th Annual Mediterranean Ad Hoc Networking Workshop, p. 98-105, © 2012 IEEE.
Yu et al. "A Smartphone Design Approach to User Communication Interface for Administering Storage System Network", Computer Engineering Department, San Jose State University, 2nd IEEE International Workshop on Smart Communication Protocols and Algorithms, p. 6555-6559, published Dec. 16, 2012.
U.S. Appl. No. 14/573,648, filed Dec. 17, 2014.
List of IBM Patents or Patent Applications Treated as Related (Appendix P), filed herewith.

* cited by examiner

ENERGY CONSCIOUS MOBILE DEVICE REDUNDANCY AND RECOVERY

BACKGROUND OF THE INVENTION

The present invention relates generally to telecommunications, and more particularly to energy conscious redundancy and disaster recovery techniques for mobile devices.

Mobile devices are capable of performing a diverse set of functions and providing a wide range of behaviors for various purposes, however, these functions can become compromised when the operating system (OS) of the mobile device locks up due to, for example, a malicious application installed on the mobile device, a software failure, or a hardware failure, etc. Users of mobile devices are presented with limited remedies in failure situations, and as such, there is potential for a loss of information stored on the mobile device. Additionally, having the mobile device become unavailable at an inopportune time, such as during an emergency, can cause other serious problems.

SUMMARY

Aspects of an embodiment of the present invention disclose a method, system, and computer program product for redundancy and recovery for a mobile device. The method includes probing, by one or more computer processors, for one or more available resources on the mobile device, wherein probing for the one or more available resources includes gathering diagnostic information related to the one or more available resources. The method includes determining, by one or more computer processors, a device functionality for the mobile device, wherein the device functionality is an energy conscious recovery plan including one or more features available on the mobile device. The method includes scavenging, by one or more computer processors, for at least one resource to support the device functionality for the mobile device. The method includes restoring, by one or more computer processors, the device functionality for the mobile device, wherein restoring the device functionality includes utilizing the at least one resource and one or more energy conscious techniques.

DETAILED DESCRIPTION

Implementation of such embodiments may take a variety of forms, and exemplary implementation details are discussed subsequently with reference to the Figures.

Figure 1:
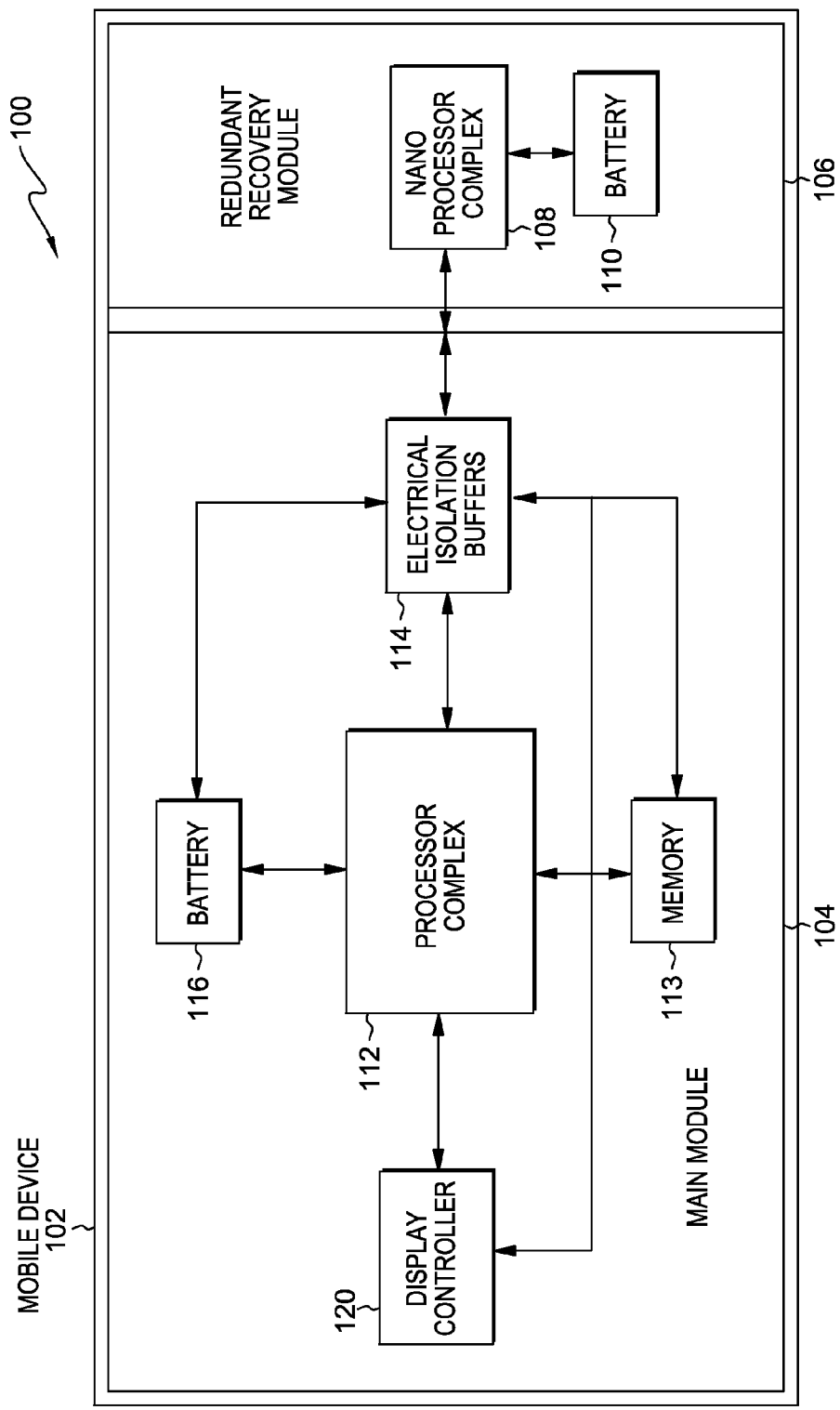
FIG. 1 illustrates a functional block diagram illustrating a data processing environment, generally designated 100, in accordance with an embodiment of the present invention.

The present invention will now be described in detail with reference to the Figures. FIG. 1 is a functional block diagram illustrating a data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Data processing environment 100 includes a mobile device 102.

In the exemplary embodiment, mobile device 102 may be, for example, a desktop computer, a laptop computer, a tablet computer, a personal digital assistant (PDA), a smart phone, a thin client, or any other electronic device or computing system capable of receiving, processing, storing, and sending data. In one embodiment, mobile device 102 may be any suitable type of mobile device capable of running mobile applications, including a smart phone, tablet, slate, or any type of device that runs a mobile operating system. Mobile device 102 includes a main module 104 and a redundant recovery module (RRM) 106.

In an alternate embodiment, mobile device 102 may be any wearable electronic device, including wearable electronic devices affixed to eyeglasses and sunglasses, helmets, wristwatches, clothing, wigs, and the like, capable of receiving, processing, storing, and sending data.

In the exemplary embodiment, main module 104 is a conventional mobile device module providing device functionality, such as sending, receiving, and processing data, through the use of one or more integrated devices, including, but not limited to, processor complex 112, battery 116, memory 113, and display controller 120. In the exemplary embodiment, processor complex 112 is a conventional processor including electronic circuitry that carries out instructions provided by an operating system, a program, or a mobile application. In one embodiment, processor complex 112 fetches instructions from memory 113 to decode and execute the instructions. In the exemplary embodiment, battery 116 is a conventional portable rechargeable battery useful in mobile device applications, for example, lithium-ion and nickel-cadmium, nickel-zinc, and nickel metal hydride. In the exemplary embodiment, memory 113 is a conventional memory device for storing instructions, programs, and data on a temporary or permanent basis. In the exemplary embodiment, display controller 120 is a conventional device used to control a display (not shown) on a mobile device, such as mobile device 102.

In the exemplary embodiment, RRM 106 is a combination of software and firmware integrated with a mobile device, such as mobile device 102, for providing energy conscious redundancy and disaster recovery for the mobile device. In the exemplary embodiment, RRM 106 resides in a dedicated physical core (i.e., separate from a main module of the mobile device, such as main module 104 of mobile device 102), and is isolated from the main module by electrical isolation buffers, such as electrical isolation buffers 114 in main module 104 of mobile device 102. In one embodiment, RRM 106 can be isolated from environmental hazards through the use of specific packaging, for example, thermal isolation, waterproofing, and shock proofing to ensure RRM 106 remains available to provide redundancy and recovery to the mobile device. In the exemplary embodiment, RRM 106 diagnoses problems on the main module using conventional reliability, availability, and serviceability (RAS) techniques. In the exemplary embodiment, RRM 106 maintains dual ported access to a memory in the main module of the mobile device, such as memory 113 in main module 104 of mobile device 102, to facilitate diagnosis. In the exemplary embodiment, RRM 106 can be activated (i.e., enabled) by a physical reset switch located on mobile device 102 (not shown). In another embodiment, RRM 106 may be activated automatically when a failure event, for example, a software failure, an electrical failure, an operating system hang up, or an environmental hazard is detected.

In the exemplary embodiment, RRM 106 restores functionality on the main module in an energy conscious manner, such that redundancy and recovery is engaged proportionally to a residual energy (i.e., battery charge). In the exemplary embodiment, RRM 106 determines device functionality for the mobile device post failure, and an energy draw necessary to provide the device functionality. RRM 106 compares the energy draw to a residual charge available, and prioritizes device functionality to be restored in an energy conscious manner, such that, for example, emergency phone services, GPS tracking beacons, and pinging, etc. are the first device functionalities gradually restored.

RRM 106 includes nanoprocessor complex 108 for providing surrogacy functionality for a processor complex on the main module, such as processor complex 112 of main module 104, in the event of a catastrophic failure of the processor complex. In the exemplary embodiment, nanoprocessor complex 108 is interconnected with one or more devices in main module 104 through a hardwired shadow plane. In the exemplary embodiment, the hardwired shadow plane is a circuit layer allowing RRM 106 to probe, monitor, and determine the health of every module on a main processor complex, such as main module 104. In some embodiments, the hardwired shadow plane may provide the capability to send signals to trigger or switch main processor complex modules to various states. In the exemplary embodiment, nanoprocessor complex 108 provides the capability to utilize the one or more devices in main module 104, such as processor complex 112, battery 116, memory 113, and display controller 120 to restore functionality in an energy conscious manner.

RRM 106 includes battery 110 for providing backup power for redundancy and recovery functionality. In the exemplary embodiment, battery 110 can be any conventional mobile device battery, for example, a rechargeable lithium ion battery. In some embodiments, battery 110 may be a solar powered battery, or any other energy conscious, self-restoring battery. In one embodiment, RRM 106 can use battery 110 to power redundancy and recovery functionality, including diagnostics, surrogacy, probing, and restoring device functionality. In the exemplary embodiment, in an effort to provide energy conscious redundancy and recovery, RRM 106 scavenges resources on the main module of the mobile device to draw charge from one or more devices, such as battery 116, to provide power for redundancy and recovery functionality, prior to operating on backup power provided by battery 110.

Figure 2:
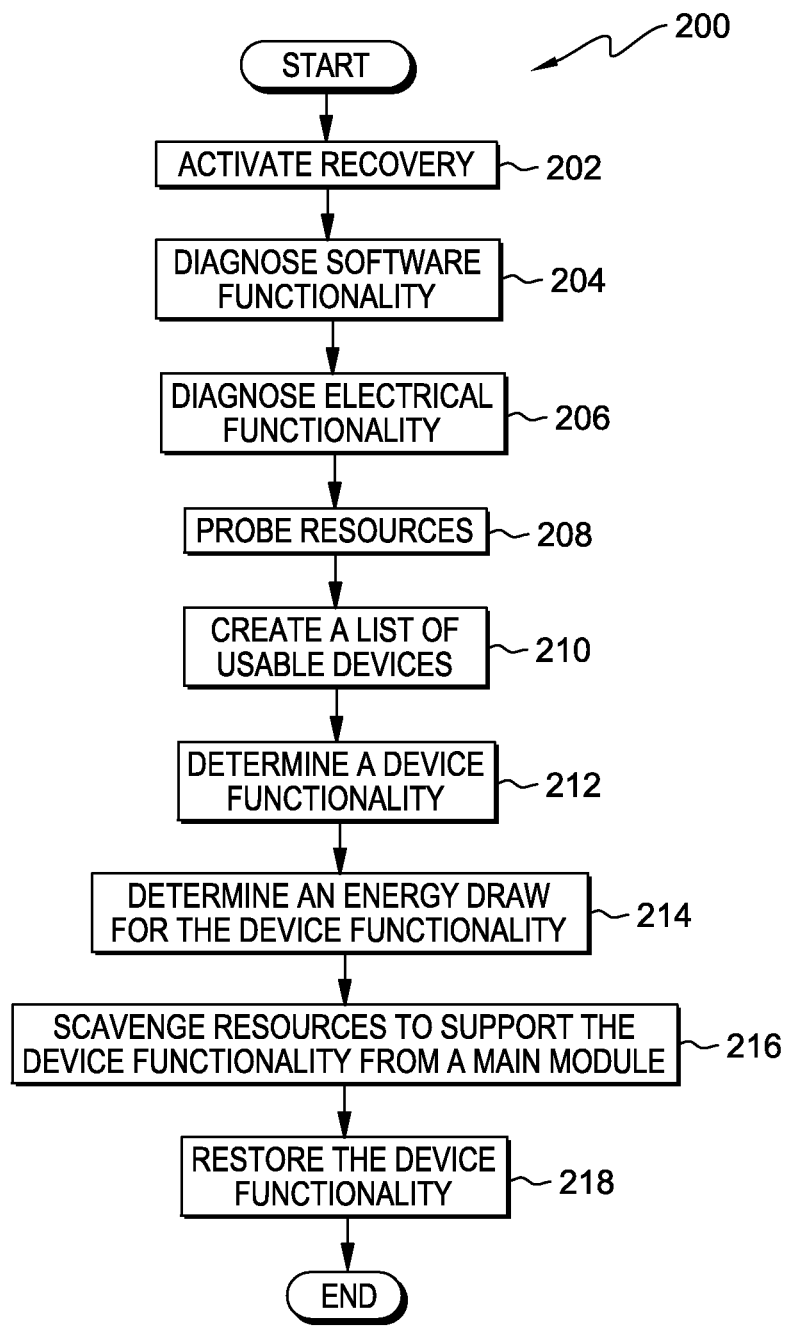
FIG. 2 depicts a flowchart of the operational steps of a redundant recovery module, generally designated 200, for energy conscious redundancy and recovery for a mobile device, in accordance with an embodiment of the present invention.

FIG. 2 depicts a flowchart of the operational steps of a redundant recovery module, such as RRM 106, generally designated 200, for energy conscious redundancy and recovery for a mobile device, in accordance with an embodiment of the present invention.

RRM 106 activates recovery (202). In the exemplary embodiment, RRM 106 activates recovery functionality in response to enablement of a phone reset switch on a mobile device (i.e., a phone reset switch being turned on by a user of the mobile device). For example, a user of a mobile device, such as mobile device 102, may begin experiencing an operating system (OS) hang up condition (e.g., a boot up malfunction) while trying to power up the mobile device. The user, in response to unsuccessfully being able to power up the mobile device, may turn on the phone reset switch of the mobile device, notifying RRM 106 to activate recovery functionality. In some other embodiments, RRM 106 may activate recovery functionality in response to a trigger condition, such as a change in an environmental condition (e.g., a change in temperature above or below a threshold temperature), or an emergency activation (e.g., a heavy shock or impact to a mobile device). For example, if a user of a mobile device is in an automobile accident, RRM 106 may activate recovery functionality in response to an impact associated with the accident.

RRM 106 diagnoses software functionality (204). In the exemplary embodiment, RRM 106 diagnoses software functionality by searching one or more devices on the mobile device for malfunctions. In the exemplary embodiment, RRM 106 searches one or more devices on the mobile device, including, without limitation, one or more registers in a processor complex, such as processor complex 112, a non-volatile memory, one or more traces of a last invocation, and a plurality of software traces and dumps. In the exemplary embodiment, RRM 106 searches for malfunctions by probing the one or more devices via a hardwired shadow plane, wherein the probing utilizes energy conscious RAS techniques. In some embodiments, RRM 106 employs a probing timeout, such that RRM 106 probes for malfunctions in software functionality proportional to a charge remaining on a battery of the mobile device, such as battery 116 of mobile device 102. For example, RRM 106 may perform a cursory diagnosis of malfunctions where a residual charge on a battery of the mobile device is low, and alternatively, perform a thorough diagnosis of malfunctions where the residual change on a battery of the mobile device is high.

RRM 106 diagnoses electrical functionality (206). In the exemplary embodiment RRM 106 diagnoses electrical functionality by searching one or more devices on the mobile device for malfunctions. In the exemplary embodiment, RRM 106 searches one or more devices on the mobile device, including, without limitation, one or more registers in a processor complex, such as processor complex 112, a battery, such as battery 116, memory, such as memory 113, and a display controller, such as display controller 120. In the exemplary embodiment, RRM 106 searches for electrical malfunctions, such as overheating, electrical shorts, etc., by probing the one or more devices via a hardwired shadow plane and diagnostic wiring, wherein the probing utilizes energy conscious RAS techniques. In some embodiments, RRM 106 employs a probing timeout, such that RRM 106 probes for malfunctions in electrical functionality proportional to a charge remaining on a battery of the mobile device, such as battery 116 of mobile device 102. For example, RRM 106 may perform a cursory diagnosis of malfunctions where a residual charge on a battery of the mobile device is low, and alternatively, perform a thorough diagnosis of malfunctions where the residual change on a battery of the mobile device is high.

RRM 106 probes resources (208). In the exemplary embodiment, RRM 106 probes resources available on a mobile device, such as mobile device 102, gathering diagnostic information related to one or more available resources, such as battery 116 and processor complex 112, for determining a state of the entire system, determining resources available for scavenging, and a total energy available to power redundancy and recovery functionality, etc.

RRM 106 creates a list of usable devices (210). In the exemplary embodiment, RRM 106 creates a list of usable devices (i.e., components) of a mobile device based, at least in part, on a diagnosis of software functionality, a diagnosis of electrical functionality, and a probing of resources available on the mobile device, such as mobile device 102. RRM 106 creates a list of usable components by inventorying one or more components, and, from these inventoried components, excludes those components experiencing malfunctions.

RRM 106 determines a device functionality (212). In the exemplary embodiment, RRM 106 determines a device functionality for a mobile device, such as mobile device 102, wherein the device functionality is a recovery plan for restoring one or more features of the mobile device, such as making an emergency phone call, activating a global positioning system, connecting to a wireless network, and broadcasting a beacon, etc., that are made available to a user of the mobile device by one or more usable devices from the list of usable devices. In some embodiments, RRM 106 determines a device functionality based, at least in part, on energy conscious techniques. For example, RRM 106 may configure a device functionality that restores only an emergency phone call option and a broadcast beacon option, based, at least in part, on a predicted low energy draw for the restored features. In another example, where a display on a mobile device is malfunctioning or damaged, rendering it unusable, RRM 106 may determine a device functionality that enables voice commands in order to initiate an emergency call.

RRM 106 determines an energy draw for the device functionality (214). In the exemplary embodiment, RRM 106 determines an energy draw for the device functionality, wherein the energy draw is a predictive value of how much energy is required to restore the one or more features available in the device functionality. For example, RRM 106 may determine an energy draw required to restore the one or more features available in the device functionality, such as an emergency phone call, enable a GPS location, and connect to a wireless network, as low to moderate.

RRM 106 scavenges resources to support the device functionality from a main module (216). In the exemplary embodiment, RRM 106 scavenges resources from a main module of a mobile device, such as main module 104 of mobile device 102 to provide sufficient charge (i.e., energy) to satisfy an energy draw required to restore one or more features available in the device functionality. For example, where an energy draw required to restore one or more features available in the device functionality is low to moderate, RRM 106 may scavenge resources, such as siphon charge from a battery, a processor complex, or a wiring harness on the main module of the mobile device, to accumulate sufficient energy to restore and power one or more features available in the device functionality.

RRM 106 restores the device functionality (218). In the exemplary embodiment, responsive to scavenging resources to provide sufficient charge to satisfy an energy draw required to restore and power one or more features, RRM 106 restores the device functionality in an energy conscious manner by bringing up the system gradually, based, at least in part, on remaining battery power, expected battery life, scavenged resources, and any external conditions affecting energy consumption (e.g., extreme cold), etc.

Figure 3:
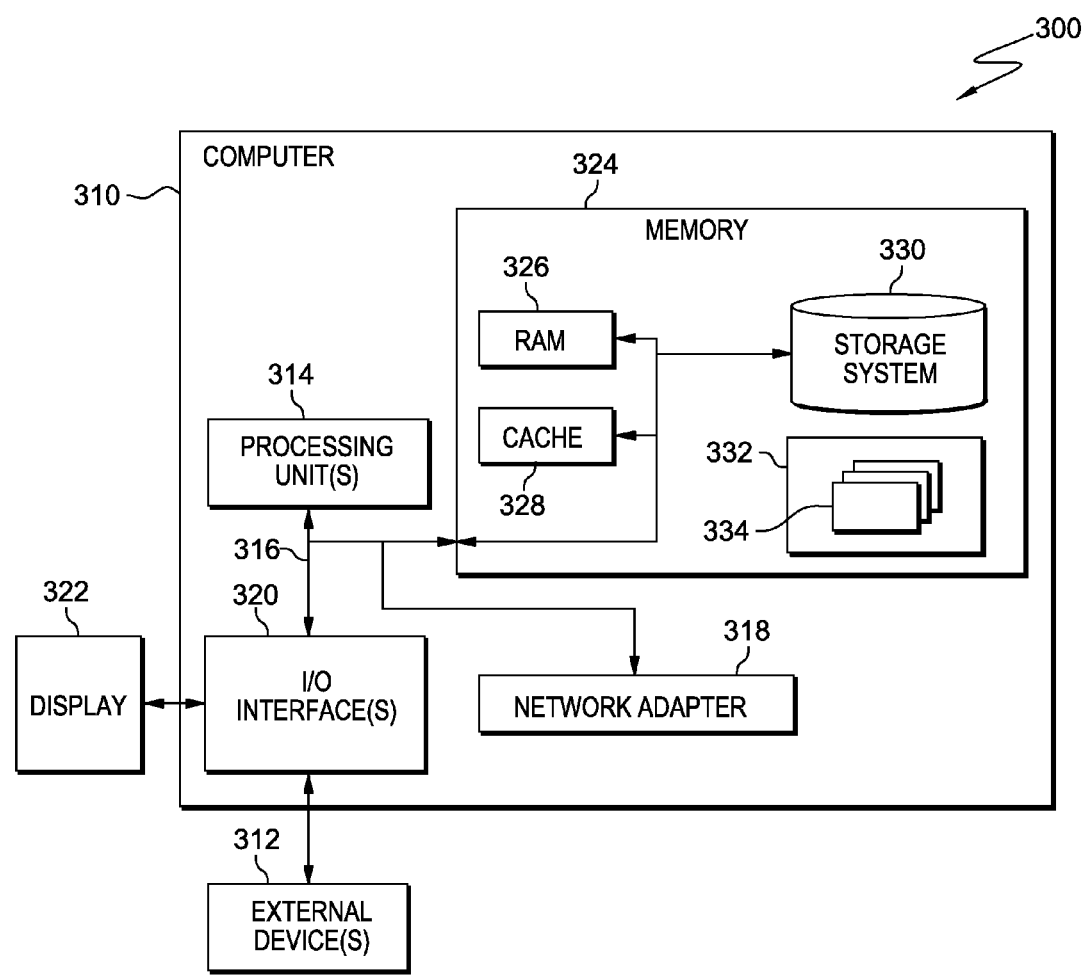
FIG. 3 illustrates a block diagram depicting components of a data processing system (such as the main module of FIG. 1), generally designated 300, in accordance with an embodiment of the present invention.

FIG. 3 is a block diagram, generally designated 300, depicting components of a data processing system (such as mobile device 106 of data processing environment 100), in accordance with an embodiment of the present invention. It should be appreciated that FIG. 3 provides only an illustration of one implementation and does not imply any limitations with regard to the environments in that different embodiments can be implemented. Many modifications to the depicted environment can be made.

In the illustrative embodiment, mobile device 106 in data processing environment 100 is shown in the form of a general-purpose computing device. The components of computer system 310 can include, but are not limited to, one or more processors or processing unit 314, memory 324, and bus 316 that couples various system components including memory 324 to processing unit(s) 314.

Bus 316 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 310 typically includes a variety of computer system readable media. Such media can be any available media that is accessible by computer system 310, and it includes both volatile and non-volatile media, removable and non-removable media.

Memory 324 can include computer system readable media in the form of volatile memory, such as random access memory (RAM) 326 and/or cache memory 328. Computer system 310 can further include other removable/non-removable, volatile/non-volatile computer system storage media. By way of example only, storage system 330 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 316 by one or more data media interfaces. As will be further depicted and described below, memory 324 can include at least one computer program product having a set (e.g., at least one) of program modules that are configured to carry out the functions of embodiments of the invention.

Program/utility 332, having one or more sets of program modules 334, can be stored in memory 324 by way of example, and not limitation, as well as an operating system, one or more application programs, other program modules, and program data. Each of the operating systems, one or more application programs, other program modules, and program data, or some combination thereof, can include an implementation of a networking environment. Program modules 334 generally carry out the functions and/or methodologies of embodiments of the invention as described herein. Computer system 310 can also communicate with one or more external devices 312 such as a keyboard, a pointing device, a display 322, etc., or one or more devices that enable a user to interact with computer system 310 and any devices (e.g., network card, modem, etc.) that enable computer system 310 to communicate with one or more other computing devices. Such communication can occur via Input/Output (I/O) interface(s) 320. Still yet, computer system 310 can communicate with one or more networks such as a local area network (LAN), a general wide area network (WAN), and/or a public network (e.g., the Internet) via network adapter 318. As depicted, network adapter 318 communicates with the other components of computer system 310 via bus 316. It should be understood that although not shown, other hardware and software components, such as microcode, device drivers, redundant processing units, external disk drive arrays, RAID systems, tape drives, and data archival storage systems can be used in conjunction with computer system 310.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A method for redundancy and recovery for a mobile device, the method comprising:
    responsive to the mobile device unsuccessfully powering up, activating, by one or more computer processors, a recovery functionality via a physical reset switch on the mobile device;
    probing, by one or more computer processors, for one or more available resources on the mobile device, wherein probing for the one or more available resources includes gathering diagnostic information related to the one or more available resources;
    determining, by one or more computer processors, a device functionality for the mobile device, wherein the device functionality is an energy conscious recovery plan including one or more features available on the mobile device;
    scavenging, by one or more computer processors, for at least one resource to support the device functionality for the mobile device, wherein scavenging includes siphoning charge from a battery, a processor complex, or a wiring harness within a main module of the mobile device to accumulate sufficient energy to restore and power the one or more features available on the mobile device; and
    restoring, by one or more computer processors, the device functionality for the mobile device, wherein restoring the device functionality includes utilizing the at least one resource and one or more energy conscious techniques.

2. The method of claim 1, wherein probing for one or more available resources on the mobile device, further comprises:
    diagnosing, by one or more computer processors, a software functionality for the mobile device, wherein diagnosing the software functionality includes utilizing one or more energy conscious reliability, availability, and serviceability (RAS) techniques; and
    diagnosing, by one or more computer processors, an electrical functionality for the mobile device, wherein diagnosing the electrical functionality includes utilizing one or more energy conscious RAS techniques.

3. The method of claim 1, further comprises:
    searching, by one or more computer processors, for one or more malfunctions in one or more devices via a hard-wired shadow plane, wherein searching includes utilizing one or more energy conscious RAS techniques.

4. The method of claim 1, wherein determining a device functionality for the mobile device, further comprises:
    creating, by one or more computer processors, a list of usable devices based, at least in part, on one or more of:
    a diagnosis of software functionality;
    a diagnosis of electrical functionality; and
    a probing of resources available on a mobile device.

5. The method of claim 1, wherein scavenging for at least one resource to support the device functionality for the mobile device, further comprises:
    determining, by one or more computer processors, an energy draw for the device functionality, wherein the energy draw is a predictive value of how much energy is required to restore the at least one feature available in the device functionality.

6. The method of claim 5, wherein determining an energy draw for the device functionality, further comprises:
    inventorying, by one or more computer processors, one or more components of the mobile device; and
    excluding, by one or more computer processors, the one or more components of the mobile device experiencing a malfunction.

7. The method of claim 1, wherein determining a device functionality for the mobile device, further comprises:
    determining, by one or more computer processors, one or more features to include in the device functionality based, at least in part, on one or more energy conscious techniques, the one or more features including one or more of:
    an emergency phone call;
    a global positioning system; and
    a beacon broadcast.

* * * * *